United States Patent
Denning

(10) Patent No.: US 6,769,741 B2
(45) Date of Patent: Aug. 3, 2004

(54) SEAT ARRANGEMENT

(76) Inventor: Paul Denning, 8 Abbotsbury Way, Nuneaton, Warwickshire, CV11 4GB (GB)

( * ) Notice: Subject to any disclaimer, the term of this patent is extended or adjusted under 35 U.S.C. 154(b) by 19 days.

(21) Appl. No.: 10/332,908
(22) PCT Filed: Mar. 29, 2001
(86) PCT No.: PCT/GN01/01379
§ 371 (c)(1), (2), (4) Date: Jan. 13, 2003
(87) PCT Pub. No.: WO02/06080
PCT Pub. Date: Jan. 24, 2002

(65) Prior Publication Data
US 2004/0021357 A1 Feb. 5, 2004

(30) Foreign Application Priority Data
Jul. 14, 2000 (GB) ................................. 017241
Aug. 12, 2000 (GB) ................................. 019801

(51) Int. Cl.⁷ ................................................ B60N 2/02
(52) U.S. Cl. .............. 297/378.13; 297/365; 297/354.12
(58) Field of Search ....................... 297/378.12, 378.13, 297/363, 364, 365, 354.12

(56) References Cited
U.S. PATENT DOCUMENTS 3,973,799 A    8/1976 Berg
4,067,611 A *  1/1978 Kurozu et al. .......... 297/378.13
4,561,694 A * 12/1985 Mouri et al. ............ 297/378.13
6,312,055 B1 * 11/2001 Uematsu ................. 297/378.13

FOREIGN PATENT DOCUMENTS

| EP | 0508964 | 10/1992 |
|---|---|---|
| EP | 0741055 | 11/1996 |
| FR | 125978 A2 * | 5/1984 |
| GB | 2095984 | 10/1982 |
| JP | 58167230 A * | 10/1983 |

* cited by examiner

Primary Examiner—Peter M. Cuomo
Assistant Examiner—Joseph Edell
(74) Attorney, Agent, or Firm—Ira S. Dorman

(57) ABSTRACT

A seat arrangement in a motor vehicle includes an adjustable latch and a rigid striker having spaced first and second striker portions. The latch includes a rotatable cam cooperating with the striker and an elongate slider biased towards a cam surface of the cam. A first portion of the slider engages the cam surface and a second portion of the slider is manually retractable away form the cam surface against a biasing force. The cam has first and second slots such that in a first position of a back rest of the seat the first striker portion engages the first slot to effect locking of the back rest in a first position, and in a second position of the back rest the second striker portion engages the second slot to effect locking of the back rest in a second position.

19 Claims, 2 Drawing Sheets

SEAT ARRANGEMENT

Figure 1:
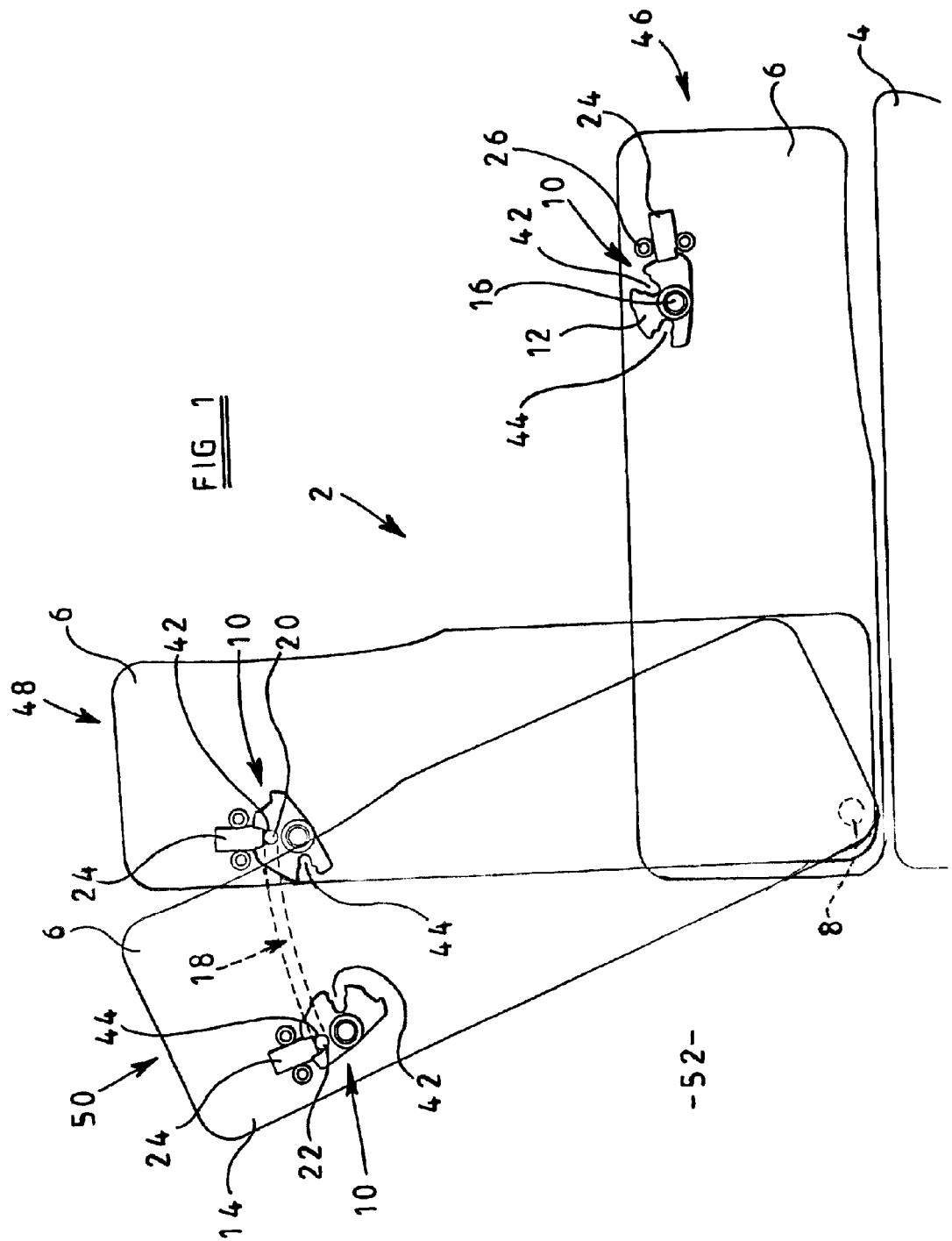

The present invention relates to a seat arrangement in a motor vehicle, such as a car, and particularly in a rear of a motor vehicle.

It is well known to provide a seat arrangement in the rear of a motor vehicle in which the seat arrangement has a back rest which can be securely latched in a partly reclined position for normal use by one or more passengers and can be folded forwards and downwards onto a cushioned base of the seat arrangement to provide access to a boot space behind the seat arrangement.

It is desirable to provide a seat arrangement which can additionally be used by passengers with the back rest in a less-inclined or upright position, thereby increasing the available boot space behind the seat arrangement. Attempts to achieve such an arrangement have involved means such as two interlocking fingers. However these have been found to be prone to distortion and to be unsatisfactory in meeting crash test requirements.

It is an object of the present invention to overcome or minimise this problem.

According to the present invention there is provided a seat arrangement in a motor vehicle, particularly in a rear thereof, comprising a base and a back rest which is pivotable at a lower region thereof to provide a selected angle of inclination thereof, including adjustable latching means adapted to be secured to a first member in the form of an upper region of at least one side of the back rest or to at least one body part of the vehicle and a rigid striker means having spaced first and second striker portions and adapted to be secured to a second member in the form of the other of the back rest and the body part, the adjustable latching means comprising: a rotatable cam member cooperating with the striker means; an elongate slider slidably secured to the first member and biased towards a cam surface of the cam member such that a first portion of the slider engages the cam surface, a second portion of the slider being adapted for manual retraction of the slider away from the cam surface against the biassing force; the cam member further having first and second slots such that in a first position of the back rest the first striker portion of the striker means engages the first slot, with the cam member orientated such that the first portion of the slider also engages the first slot to effect locking of the back rest in this first position; and in a second position of the back rest the second striker portion of the striker means engages the second slot, with the cam member orientated such that the first portion of the slider also engages the second slot to effect locking of the back rest in this second position.

In the first position of the back rest, the back rest may be secured at a full extent of backwards inclination; and in the second position of the back rest, the back rest may be secured in a generally upright orientation.

The first and second slots may be provided in the cam surface of the cam member. The cam surface may comprise an edge of the cam member.

The cam surface may have stop means for contacting the first portion of the slider to limit rotation of the cam member. Thus, in a third position of the back rest, with the adjustable latching means free from contact with the striker means, the first portion of the slider contacts the stop means. In the third position of the back rest, the back rest may be folded forwards towards the base. The stop means may comprise a protrusion on the edge of the cam member.

Manual retraction of the slider may be effective to disengage the first portion of the slider from the first slot to allow the back rest to be moved from either of the first and second positions, for example towards the other of the second and first positions or the third position.

The cam member may be spring-biased to create friction tending to resist rotation of the cam member.

The first and second slots in the cam member may be stepped whereby an inner portion thereof for accommodating the first or second striker portion of the striker means is narrower than an associated outer portion thereof for accommodating the first portion of the slider, one or more shoulders being provided at the interface between the inner and outer portions for engagement by a leading edge of the first portion of the slider.

The slider may be slidably accommodated in bearing or housing means secured to the first member.

The slider and/or the bearing and/or the housing means may be coated with a plastics, or other suitable, material, to facilitate sliding.

Indicating means may be provided, associated with the slider, for indicating engagement, or otherwise, of the slider with the first or second slots and hence whether or not the back rest is securely latched.

An interlock may be provided between the slider and a seat belt mechanism to prevent use of the seat belt unless the seat is securely locked in position.

The cam member may be rotatably mounted on a bolt means, such bolt means passing through a hole in the cam member and secured relative to (to or in) the first member.

The cam member may comprise a metal, such as steel, or a suitable alloy. The cam member may be coated with a plastics material to prevent or reduce rattles.

The adjustable latching means may be provided at one or both sides of the first member.

The striker means may comprise an elongate striker loop having first and second opposed end regions or a plurality of striker pins.

By means of the present invention a seat arrangement can be provided in the rear of a motor vehicle, such as a car, and where in addition to the back rest being securely latchable in a normal inclined position and foldable downwardly onto a base portion to provide open access to rear boot space, the back rest is also securely latchable in an intermediate position, such as a substantially vertical position, to provide useful extension of the boot space while permitting safe use of the seat arrangement by one or more passengers.

Figure 2:
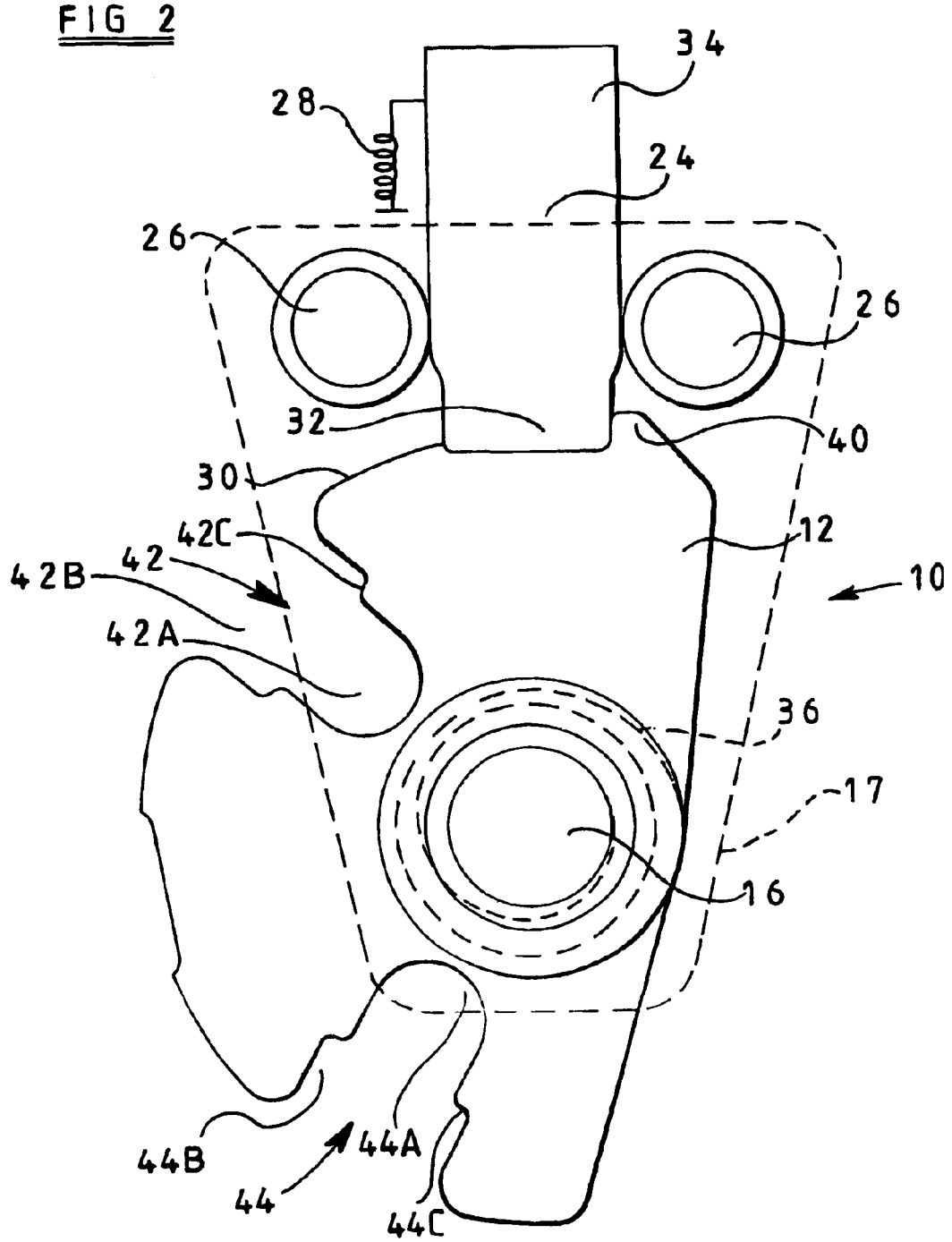

For a better understanding of the invention and to show more clearly how it may be carried into effect, reference will now be made, by way of example, to the accompanying drawings in which:

FIG. 1 is a side view of a seat arrangement according to the present invention in a motor vehicle; and FIG. 2 is a plan view of adjustable latching means for use in the seat arrangement of FIG. 1.

A seat arrangement 2 for use in the rear of a motor vehicle, particularly a car, has a cushioned base 4 and a back rest 6. The back rest 6 is pivotable at a lower region 8 thereof to provide a selected angle of inclination thereof.

The back rest 6 is provided at one or, more preferably, both sides thereof with adjustable latching means 10, as shown in detail in FIG. 2. The latching means 10 comprises a cam member in the form of a cam-like plate 12, such as of steel or other suitable metal or metal alloy, which is rotatably secured to an upper side region 14 of the back rest 6. Means, such as a pin or a bolt 16 passing through a hole in the cam-like plate 12 and into the back rest 6, is provided to rotatably secure the cam-like plate 12 to the upper side region 14 of the back rest 6.

The cam-like plate 12 is arranged to cooperate with an elongate rigid striker loop 18, suitably formed of steel, and having first and second spaced striker portions in the form of opposed end regions 20 and 22 respectively. The striker loop 18 is rigidly secured to a body part (not shown) of the motor vehicle. It should be noted the striker loop could be replaced by other suitable striker means, such as striker pins rigidly secured to a body part of the vehicle.

The latching means 10 includes an elongate slider 24 which is slidably secured to the upper side region 14 of the back rest 6. The slider 24 slides in bearings 26 and/or a suitable housing means and is spring-biased by a spring 28 (shown diagrammatically only) towards an edge 30 of the cam-like plate 12. A first portion of the slider 24 in the form of end 32 engages the edge 30 of the cam-like plate 12 and a second portion of the slider in the form of end 34 is adapted to be manually gripped by a user to retract the slider 24 away from the edge 30 of the cam-like plate 12 against the bias of the spring 28, when adjustment of the position of the back rest 6 is required. The slider 24 and/or the bearings 26 may be coated with a plastic, or other suitable material, to facilitate sliding.

A compression spring 36 is provided for cooperating with the cam-like plate 12 to create a certain amount of friction so as to prevent unwanted rotation of the cam-like plate.

A stop, comprising a protrusion 40, is provided on the edge of the cam-like plate 12 and is arranged to contact the first end 32 of the slider 24 to limit rotation of the cam-like plate 12.

The cam-like plate has a first slot 44 and a second slot 42 provided in the edge thereof and spaced apart from one another and from the protrusion 40. The slots 42, 44 are stepped to provide inner and outer portions of different widths. The slot 42 has an inner portion 42A which is narrower than an outer portion 42B, the portions being separated by a shoulder 42C. Likewise, the slot 44 has inner and outer portions 44A and 44B respectively and a shoulder 44C.

An intermediate stop 45 is provided between the first and second slots 44 and 42 as will be explained in more detail hereinafter.

The latch arrangement is mounted within a housing (not shown) to which one end of each of the bearings 26 is mounted together with one end of the pin 16. The other end of each of the bearings 26 and the other end of the pin 16 are received in a retaining plate 17, shown diagrammatically in FIG. 2. The retaining plate 17 is also received in the housing (not shown). In this way the opposing ends of the bearings 26 and of the pin 16 are securely mounted and are able to withstand very substantial forces in the event of an impact.

In a first position 50 of the back rest 6 the end 22 of the striker loop 18 is received in the first slot 44 and is retained therein by engagement of the slider 24 in the slot. In the first position the back rest 6 is in a normal, slightly reclined, configuration.

In a second position 48 of the back rest 6 the end 20 of the striker loop 18 is received in the second slot 42 and is retained therein by engagement of the slider 24 in the slot. In the second position the back rest 6 is in a generally upright configuration.

In a third position 46 of the back rest 6, with the adjustable latching means 10 free from contact with the striker loop 18 and with the back rest 6 suitably folded forward onto the base 4 of the seat arrangement, the first end 32 of the slider 24 contacts the protrusion 40 at the edge of cam-like plate 12.

As the back rest 6 is lifted from the third position into the second position 48 the first end region 20 of the striker loop 18 engages the outer portion 42B of the second slot 42. The cam-like plate 12 is rotated by the striker loop and the first end region 20 of the striker loop 18 engages the inner portion 42A of the second slot 42. The first end 32 of the spring-biased slider 24 engages the outer portion 42B of the second slot 42 and abuts the shoulder 42C. The back rest 6 is thereby securely locked in this second position 48.

If the first end 32 of the slider 24 is manually retracted from the second slot 42, against the bias of the spring 28, by gripping and pulling the second end 34 of the slider 24, the back rest 6 can be moved out of the second position towards the first position 50. As the back rest 6 is pushed out of the second position engagement between the slot 42 and the first end 20 of the striker loop 18 causes the cam-like plate 12 to rotate and the slider 24 is biased into engagement with the intermediate stop 45. On reaching the second end region 22 of the striker loop 18, the end region 22 engages the outer portion 44B of the first slot 44. The cam-like plate 12 is rotated by the striker loop and the second end region 22 of the striker loop 18 engages the inner portion 44A of the first slot 44. The first end 32 of the spring-biased slider 24 engages the outer portion 44B of the first slot 44 and abuts the shoulder 44C. The back rest 6 is thereby securely locked in the first position 50.

To release the back rest 6 from the first position 50 to fold it forwards, the slider 24 is manually lifted. The back rest 6 can then be pulled forward. The second end region 22 of the striker loop 18 disengages from the first slot 44 and the slider engages with the intermediate stop 45. The back rest can then be moved forward until it becomes secured in the second position 48.

To release the back rest 6 from the second position 48 to fold it forwards and downwards into the third position 46, the slider 24 is manually lifted. The back rest 6 can then be pulled forward, the cam-like plate 12 rotating to disengage the first end region 20 of the striker loop 18 from the second slot 42. The cam-like plate 12 then assumes a rest position with the protrusion 40 in contact with the first end 32 of the slider 24.

As a result of the invention the back rest 6 can be securely latched in a normal inclined (or reclined) position 50 or in a less-inclined (generally upright) position 48. Such less-inclined position 48 provides increased space in a boot 52 behind the seat arrangement 2, while allowing safe accommodation of one or more passengers on the seat arrangement 2. The seat arrangement 2 can also be folded down into the position 46 which allows open access to the boot 52.

Indicating means (not shown) can be provided, associated with the slider 24, for indicating engagement, or otherwise, of the slider 24 with the first or second slots 44, 42 in the edge of the cam-like plate 12 and hence indicating whether or not the back rest 6 is securely latched.

Additionally, an interlock can be provided between the slider 24 and a seat belt mechanism (not shown) to prevent use of the seat belt unless the seat is securely locked in position.

If required a shot bolt arrangement may be incorporated, for example between the seat frame and the vehicle body and/or, more particularly, between adjacent frame portions of a split seat arrangement, to give added security and rigidity to the seat frame.

Although the invention has been described with the adjustable latching means secured to the seat back rest and the striker loop attached to a part of the vehicle body, it will be readily apparent the locations of these components can be interchanged and the adjustable latching means can alternatively be secured to a vehicle body part with the striker loop attached to the seat back rest.

It will be apparent the seat arrangement could be locked in additional positions if desired.

What is claimed is:

1. A seat arrangement in a motor vehicle, particularly in a rear thereof, comprising a base (4) anti a back rest (6) which is pivotable at a lower region (8) thereof to provide a selected angle of inclination thereof, wherein adjustable latching means (10) is adapted to be secured to a feature selected from a first member in the form of an upper region (14) of at least one side of the back rest and a least one body part of the vehicle and wherein a rigid striker means (18) having spaced first and second striker portions (20, 22) is adapted to be secured to a second member in the form of the other or the back rest and the body part, the adjustable hitching means (10) comprising: a rotatable cam member (12) cooperating with the striker means (18); an elongate slider (24) slidably secured to the first member and subject to a biasing force towards a cam surface (30) of the cam member such that a first portion of the slider engages the cam surface, a second portion of the slider being adapted for manual retracting of the slider away from the cam surface against the biasing force; the cam member (12) further having first and second slots (44, 42) such that in a first position of the back rest (6) the first striker portion (20) of the striker means engages the first slot (44), with the cam member (12) orientated such that the first portion of the slider also engages the first slot (44) to effect locking of the back rest in the first position: and in a second position of the back rest (6) the second striker portion (22) of the striker means engages the second slot (42), with the cam member (12) orientated such that the first portion of the slider also engages the second slot (42) to effect locking of the back rest (6) in the second position.

2. A seat arrangement as claimed in claim 1, wherein, in the first position of the back rest (6), the back rest is secured at a full extent of backwards inclination; and in the second position of the back rest, the back rest is secured in a generally upright orientation.

3. A scat arrangement as claimed in claim 1, wherein the first and second slots (44, 42) are provided in the cam surface (30) of the cam member (12).

4. A seat arrangement as claimed in claim 1, wherein the cam surface (30) comprises an edge of the earn member (12).

5. A scat arrangement as claimed in claim 1, wherein the cam surface (30) has stop means (40) for contacting the first portion of the slider to limit rotation of the cam member (12).

6. A scat arrangement as claimed in claim 5, wherein, in a third position of the back rest (6), with the adjustable latching means (10) free from contact with the striker means (18), the first position of the slider contacts the stop means (40).

7. A seal arrangement as claimed in claim 6, wherein, in the third position of the back rest (6), the back rest is folded forward towards the base (4).

8. A scat arrangement as claimed in claim 5, wherein the stop means (40) comprises a protrusion on the edge of the cam member (12).

9. A seat arrangement as claimed in claim 1, wherein manual retraction of the slider (24) is effective, to disengage the first portion of the slider from the first slot (44) to allow the back rest (6) to be moved from either of the first and second positions.

10. A seat arrangement as claimed in claim 1, characterised in that the cam member (12) is spring-biased (36) to create friction tending to resist rotation of the cam member.

11. A seat arrangement as claimed in claim 1, wherein the first and second slots (44, 42) in the cam member (12) are stepped whereby an inner portion (44A, 42A) thereof for accommodating a striker portion selected from the first and second striker portion (20, 22) of the striker means (18) is narrower than an associated outer portion (44B, 42B) thereof for accommodating the first portion of the slider, at least one shoulder (44C, 42C) being provided at the interface between the inner and outer portions for engagement by a leading edge of the first portion of the slider.

12. A seat arrangement as claimed in claim 1, wherein the slider (24) is slidably accommodated in means selected from bearing and housing means secured to the first member.

13. A seat arrangement as claimed in claim 12, wherein at least one of the slider (24), the bearing and the housing means is coated with a material selected from plastics, and other suitable, material, to facilitate sliding.

14. A seat arrangement as claimed in claim 1, wherein the cam member (12) is rotatably mounted on a bolt means (16), such bolt means passing through a hole in the cam member and secured relative to the first member.

15. A seat arrangement as claimed in claim 1, wherein the cam member (12) comprises a metal selected from steel and a suitable alloy.

16. A seat arrangement as claimed in claim 15, wherein the cam member (12) is coated with a plastics material.

17. A seat arrangement as claimed in claim 1, wherein the adjustable latching means (10) is provide at at least one side of the first member.

18. A seat arrangement as claimed in claim 1, wherein the striker means (18) comprises an elongate striker loop having first and second opposed end regions (20, 22).

19. A seat arrangement as claimed in claim 1, wherein the striker means (18) comprises a plurality of striker pins (20, 22).

* * * * *